US008301029B2

(12) United States Patent
Fischer

(10) Patent No.: US 8,301,029 B2
(45) Date of Patent: Oct. 30, 2012

(54) ELECTROACOUSTIC TRANSDUCER

(75) Inventor: Balthasar Fischer, Vienna (AT)

(73) Assignee: XARION Laser Acoustics GmbH, Vienna (AT)

( * ) Notice: Subject to any disclaimer, the term of this patent is extended or adjusted under 35 U.S.C. 154(b) by 657 days.

(21) Appl. No.: 12/306,583

(22) PCT Filed: Jun. 26, 2007

(86) PCT No.: PCT/AT2007/000311

§ 371 (c)(1), (2), (4) Date: Dec. 24, 2008

(87) PCT Pub. No.: WO2008/000007

PCT Pub. Date: Jan. 3, 2008

(65) Prior Publication Data

US 2009/0257753 A1 Oct. 15, 2009

(30) Foreign Application Priority Data

Jun. 27, 2006 (AT) ................................ A 1082/2006

(51) Int. Cl.
*H04B 10/02* (2006.01)

(52) U.S. Cl. ........ 398/133; 398/132; 398/130; 398/118; 398/188

(58) Field of Classification Search .................. 398/118, 398/130, 140, 151, 172, 132–134, 188
See application file for complete search history.

(56) References Cited

U.S. PATENT DOCUMENTS

| | | | | |
|---|---|---|---|---|
| 4,674,872 | A * | 6/1987 | Wright | 356/73.1 |
| 5,712,840 | A * | 1/1998 | Matsumura et al. | 369/13.29 |
| 6,014,239 | A * | 1/2000 | Veligdan | 398/134 |
| 6,055,080 | A * | 4/2000 | Furstenau et al. | 398/139 |
| 6,147,787 | A * | 11/2000 | Veligdan | 398/133 |
| 6,301,034 | B1 | 10/2001 | Speciale | |
| 6,427,014 | B1 * | 7/2002 | Eastty | 381/111 |
| 6,590,661 | B1 | 7/2003 | Shnier | |
| 7,391,976 | B2 * | 6/2008 | Kobayashi et al. | 398/133 |
| 7,405,826 | B2 * | 7/2008 | Gibbs et al. | 356/432 |
| 2003/0210730 | A1 * | 11/2003 | Tomaru et al. | 372/101 |
| 2004/0253838 | A1 * | 12/2004 | Yamazaki et al. | 438/795 |
| 2005/0288535 | A1 * | 12/2005 | Wheland et al. | 570/134 |
| 2011/0123199 | A1 * | 5/2011 | Hashimoto et al. | 398/134 |

FOREIGN PATENT DOCUMENTS

| | | | |
|---|---|---|---|
| GB | 386315 | A | 1/1933 |
| JP | 60018100 | A * | 1/1985 |
| JP | 60018100 | A1 | 1/1985 |

* cited by examiner

*Primary Examiner* — Kenneth N Vanderpuye
*Assistant Examiner* — Hibret Woldekidan
(74) *Attorney, Agent, or Firm* — Steven McMahon Zeller; Dykema Gossett, PLLC

(57) ABSTRACT

An acoustoelectric transducer comprising a laser source A and a light receiver H, wherein a soundfield S is provided by which the propagation velocity of the laser beam may be modulated according to the sound pressure while it traverses the soundfield S.

6 Claims, 1 Drawing Sheet

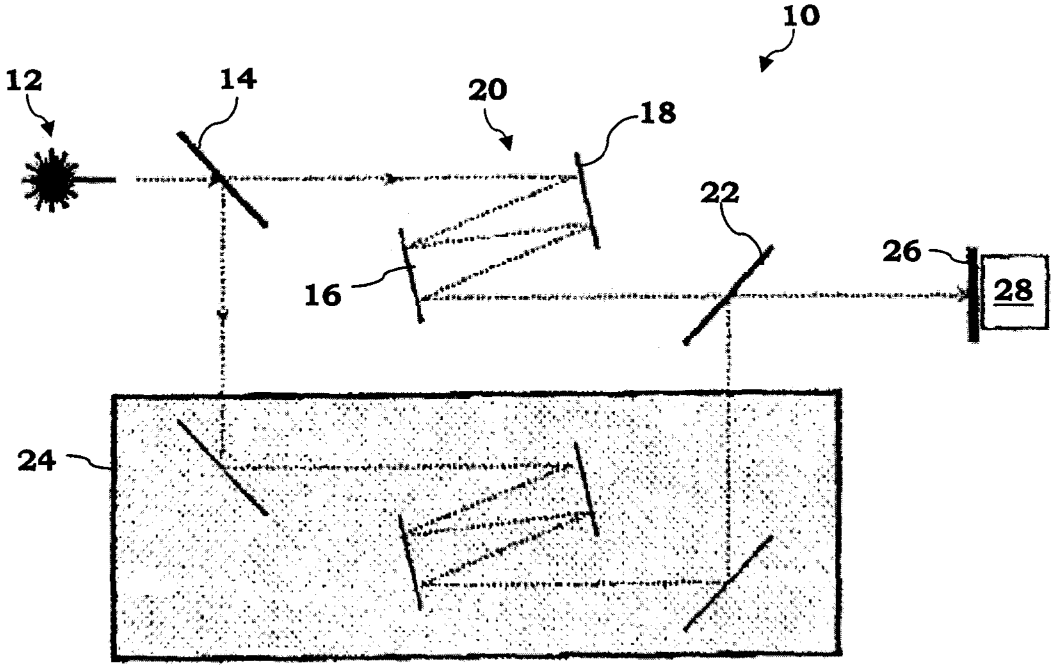
10
12
14
20
18
22
26
28
16
24

ELECTROACOUSTIC TRANSDUCER

CROSS REFERENCE TO RELATED APPLICATIONS

This application is a National Phase of PCT International Application No. PCT/AT2007/000311, filed Jun. 26, 2007, which claims priority under 35 U.S.C. §119 to Austrian Patent Application No. A 1082/2006 filed Jun. 27, 2006, the entire disclosures of which are herein expressly incorporated by reference.

SUBJECT OF THE INVENTION

This invention relates to the faithful conversion of acoustic signals (noise, voice and music) into electric signals. The electric signals may then be transmitted or stored by conventional methods. A microphone is introduced, which directly transduces the sound waves into optical and then into electric signals without requiring the aid of movable components such as a diaphragm.

For this purpose the novel microphone uses the influence of sound waves, more precisely, their pressure fluctuations on the light velocity of a laser beam which traverses the medium of the sound field. The change of the light velocity Δc is proportional to the sound pressure $\tilde{p}$. This small change Δc may be determined by means of an interference assembly and then transduced into an electric signal proportional to the sound pressure. This is the output signal of the novel microphone.

PRIOR ART

With the currently used microphones (sound transducers) the sound pressure deflects elastic components such as a diaphragm. The deflection is converted into the electrical measuring signal.

Very popular is the dynamic microphone, where the deflection of the diaphragm induces a voltage within a coil. Nowadays the largest dynamics are achieved with the capacitor microphone, wherein the deflection of the diaphragm causes a change in the capacitance of the capacitor. Since lately there have been microphones available, wherein optical methods (e. g. interference or reflection) are adopted to measure the diaphragm deflection. There are always movable or deflectable parts (diaphragm, moving coil, ribbon, powdered coal) involved.

DISADVANTAGES

Mechanical systems have natural vibrations and their deflection is limited whereby the electric output signal is partially falsified. It is difficult to reliably compensate such influences in the large pressure range (audibility threshold: 20 μPa, threshold of pain: 100 Pa) and in the wide frequency range (20 Hz to 20 kHz).

Mechanical systems also respond to structure-borne sound and to air flows, which may cause interfering signals.

Sensitive, precise and low-noise microphones are usually not sufficiently small and thus interfere with the soundfield to be measured.

In electrically measuring systems (capacitor, moving coil) electromagnetic stray fields may affect the output signal.

GOAL

What is desired is a sound transducer which converts the sound waves undistorted into electric signals, wherein no movable parts are required. It shall work in the entire audible frequency range and at all loudness levels.

BRIEF DESCRIPTION OF THE DRAWING

FIG. 1 is a plan view of a microphone with interference of visible light based on the modulation of the refractive index of air.

SOLUTION

The light velocity in a medium is $$c_M = \frac{c}{n} \tag{1}$$

c: light velocity in vacuum $c=3.10^8$ ms n: refractive index of the medium.

The refractive index of air at 15° C. and under a pressure of 0.101 MPa is 1.000326 for light having a wavelength of 0.2 μm and 1.000274 for light having a wavelength of 1 μm. Therefore it is larger than the refractive index of 1 in vacuum by $326.10^{-6}$ for UV light and by $274.10^{-6}$ for IR light.

The refractive index also changes with the pressure such as $$\frac{dn}{dp} = \frac{0.3\cdot 10^{-3}}{10^5\text{Pa}} = 3\cdot 10^{-9}\frac{1}{\text{Pa}} \tag{2}$$

but depending on the light wavelength. Therefore, also the light velocity changes (Eq. 1) according to:

$$\Delta c_M = \frac{-c}{n^2}\frac{dn}{dp}\Delta p \tag{3}$$

For example, the light velocity in air decreases by 0.9 m/s when the air pressure is increased by 1 Pa.

The change in light velocity according to Eq. 3 may be used to determine the sound pressure. Δc of the light beam is proportional to the sound pressure $\tilde{p}$ in the traversed soundfield.

By means of the interference of both halves of a splitted laser beam, this small change in velocity Δc may be determined. In FIG. 1 the design is schematically depicted.

FIG. 1 is a plan view of an microphone 10 with interference of visible light based on the modulation of the refractive index of air. The microphone 10 includes a laser 12 of arbitrary wavelength, a first semitransparent mirror 14, two mirrors 16, 18, a soundfield 20, a second semitransparent mirror 22, a sound insulated housing 24, a screen 26, and a detector 28. The sound insulated housing 24 is provided with a first opening for pressure equalization, a second opening for the entry of radiation, and a third opening for the exit of radiation. Interference rings are formed on the screen 26, and the detector 28 is in the form of a photodiode.

Subsequent to the splitting on the mirror 14 the one beam is directed through the soundfield 20 along the path of the length $L_1$. The other beam travels on the path of the length $L_2$ through the sound-insulated housing 24. Both of the beams interfere behind the mirror 22. The detector 28 determines the intensity of the light and gives a proportional electric signal.

Both of the beams are described by two wave equations:

$$E_1=A\cos(\omega t-L_1k_1) \quad (4)$$

$$E_2=A\cos(\omega t-L_2k_2) \quad (5)$$

A: amplitude

ω: angular frequency ω=2πν; ν: frequency of light $L_1$: path between the mirrors within the soundfield S $L_2$: path within the sound-insulated housing G (note: the remaining light paths are assumed to be of equal length. Thus they have no influence on the calculation)

$k_1$: wave number in the soundfield $$k_1=\frac{2\pi}{\lambda_1}=\frac{\omega}{c_M+\Delta c}=\frac{\omega}{c_M}\left(1-\frac{\Delta c}{c_M}\right) \quad (6)$$

(note: it is allowed to discontinue the progression after the first term, since $$\frac{\Delta c}{c_M}$$

is very small compared to 1)

$k_2$: wave number in the insulated housing $$k_2=\frac{2\pi}{\lambda_2}=\frac{\omega}{c_M} \quad (7)$$

$\lambda_1$ and $\lambda_2$: wavelengths.

A light intensity I, which is proportional to $(E_1+E_2)^2$, is present at the receiver.

Due to the time averaging over one light period the time dependence drops out and for the intensity at the receiver it follows $$I=I_0\{1-\cos(L_1k_1-L_2k_2)\} \quad (8)$$

$$I=I_0-I_0\cos\left\{\frac{\omega}{c_M}(L_1-L_2)-\frac{\omega}{c_M}\frac{\Delta c}{c_M}L_1\right\} \quad (9)$$

Trigonometric Conversion $$I=I_0-I_0\left\{\cos\frac{\omega}{c_M}(L_1-L_2)\cos\frac{\omega}{c_M}L_1\frac{\Delta c}{c_M}\right\}-I_0\left\{\sin\frac{\omega}{c_M}(L_1-L_2)\sin\frac{\omega}{c_M}L_1\frac{\Delta c}{c_M}\right\} \quad (10)$$

Via the phase difference $(L_1-L_2)$ it is possible to set $$\frac{\omega}{c_M}$$

to each value between 0 and 2π, wherein multiples of 2π may be added thereto. If the value $$(L_1-L_2)=\frac{c_M}{\omega}\left(\frac{\pi}{2}+z2\pi\right)$$

is selected therefore (z being an integer), the cosine function disappears.

What remains is only $$I=I_0-I_0\sin\left\{2\pi\frac{L_1}{\lambda}\frac{\Delta c}{c_M}\right\} \quad (11)$$

Here $$\frac{2\pi}{\lambda}$$

with the wavelength λ takes the place of $$\frac{\omega}{c_M}.$$

Since the argument of the sine function is very small compared to 1 it may be approximately substituted by its argument.

The decrease in the intensity $I_0-I$ (measured at the receiver) is $$I_0-I=I_0\frac{2\pi L_1}{\lambda}\frac{\Delta c}{c_M} \quad (12)$$

It is proportional to the change in the light velocity Δc and to the length $L_1$ of the light path in the soundfield. Due to Eq. (3) it is then also proportional to the sound pressure $\tilde{p}$. It is this proportionality between sound pressure and change in intensity at the receiver the function of the suggested microphone without a diaphragm is based upon.

REFERRING TO THE DRAWING THE INVENTION WILL BE EXPLAINED IN MORE DETAIL BY MEANS OF ONE EXEMPLARY EMBODIMENT

A prototype of a diaphragmless microphone by means of light interference is presently not yet available. However, the principle as it is described under section 6 (Solution) could be verified using an experimental setup.

The laser 12 is a laser made of a high performance green laser pointer and serves as a radiation source. The laser 12 is a diode pumped neodymium-yttrium-aluminum-garnet laser having a frequency doubling. The wavelength is 532, the output power is max. 5 mW. The laser 12 was removed from its housing and attached to the optical bench by means of a fixture member. For beam splitting so called beamsplitter cubes were utilized, since they provide a clearer split of the beam in comparison to a semitransparent mirror, i.e. they do not cause any secondary reflection. Moreover, silver plated mirrors 16, 18 are used to achieve a highest possible reflectance. The detector 28 is a photodiode which, having an already integrated preamplifier, provides an output signal of 0.4 A/W (Newport Battery Biased Silicon Pin Detector). The output signal of the detector 28 is supplied to a digital storage oscilloscope (Tektronix TDS220).

An Elac™ speaker being connected to a small amplifier is used as a sound source. The signals are generated through a function generator (KR-Lab Sweep Generator F 47).

For example, three sine signals generated by the tone generator having 500 Hz, 1 kHz und 2 kHz, were measured by the diaphragmless microphone and displayed on the oscilloscope as a function of time.

ADVANTAGES OF THE INVENTION

Surprisingly, it is possible even with the experimental form of the novel microphone to convert sound signals without the aid of moved parts (diaphragms), thus without mechanics, into electric signals.

Subsequent to the required development the microphone could be manufactured small, robust and compact. Its influence on the soundfield would then be small.

Since the microphone is operating optically, electromagnetic interference fields have hardly an influence.

The principle of the invention may also be utilized for sound measurement with other media than air.

Thanks to the interference method between the two laser beams, changes in air pressure (weather, operational altitude) have no influence.

The invention claimed is:

1. An acoustoelectric transducer comprising:

a laser source;

an optical detector;

a beam splitter configured to split a laser beam from said laser source into a first beam portion and a second beam portion;

a soundfield through which said first beam portion passes; and an acoustically-insulated housing through which said second beam portion passes;

wherein the propagation velocity of said first beam portion varies according to the sound pressure in said soundfield and said detector produces an electrical signal responsive to at least the variation in the propagation velocity of said first beam portion, wherein a phase difference between the first beam portion and the second beam portion is adjustable to $\lambda/4+\lambda z$, wherein z is an integer.

2. An acoustoelectric transducer according to claim 1, wherein the variation of the propagation velocity of said first beam portion is detectable by interference with said second beam portion.

3. An acoustoelectric transducer according to claim 1, wherein the two beam portions each are reflected multiple times between two plane parallel mirrors, wherein the one of the mirror pairs and its interspace is exposed to sound whereas the other one is protected against sound.

4. An electroacoustic transducer according to claim 1, wherein said housing comprises:

a first opening through which said second beam portion enters; and a second opening through which said second beam portion exits.

5. An electroacoustic transducer according to claim 4, wherein said housing further comprises a third opening for pressure equalization between the interior of said housing and the atmosphere surrounding said housing.

6. An acoustoelectric transducer comprising:

a laser source;

an optical detector;

a beam splitter configured to split a laser beam from said laser source into a first beam portion and a second beam portion;

a soundfield through which said first beam portion passes; and an acoustically-insulated housing through which said second beam portion passes;

wherein the propagation velocity of said first beam portion varies according to the sound pressure in said soundfield and said detector produces an electrical signal responsive to at least the variation in the propagation velocity of said first beam portion, wherein the two beam portions each are reflected multiple times between two plane parallel mirrors, wherein the one of the mirror pairs and its interspace is exposed to sound whereas the other one is protected against sound.

* * * * *